United States Patent [19]
Hulbert

[11] Patent Number: 5,574,972
[45] Date of Patent: Nov. 12, 1996

[54] MOBILE RADIO SYSTEM HAVING POWER LEVEL CONTROL SIGNALLING

[75] Inventor: Anthony P. Hulbert, Shirley, England

[73] Assignee: Roke Manor Research Limited, Hampshire, England

[21] Appl. No.: 393,823

[22] Filed: Feb. 24, 1995

[30] Foreign Application Priority Data

Mar. 10, 1994 [GB] United Kingdom .................. 9404612

[51] Int. Cl.⁶ ...................................................... H04B 7/26
[52] U.S. Cl. ...................... 455/33.1; 455/54.1; 455/56.1; 455/70
[58] Field of Search .................................. 455/33.1, 33.2, 455/54.1, 56.1, 68–70, 127, 62, 67.1; 375/205

[56] References Cited

U.S. PATENT DOCUMENTS 5,386,588  1/1995  Yasuda ..................... 455/56.1
5,386,589  1/1995  Kanai ....................... 455/69

FOREIGN PATENT DOCUMENTS

WO91/07020  5/1991  WIPO.
WO92/21196  11/1992  WIPO.

*Primary Examiner*—Chi H. Pham
*Attorney, Agent, or Firm*—Hill, Steadman & Simpson

[57] ABSTRACT

Cellular mobile radio system having at least two base stations, and at least one mobile unit arranged to communicate with the base stations via a radio medium is provided. Each base station includes apparatus for detecting the power of received signals, apparatus for generating a power control signalling bit for controlling the amplitude of a power signal, and apparatus for transmitting the power signal to the mobile unit. The mobile unit includes apparatus for receiving the power control bits, and apparatus means for monitoring the power control bits to identify the base station sending a greater number of control bits over a transmit frame, indicating that base station has received the higher average power signal over the transmit frame.

9 Claims, 2 Drawing Sheets

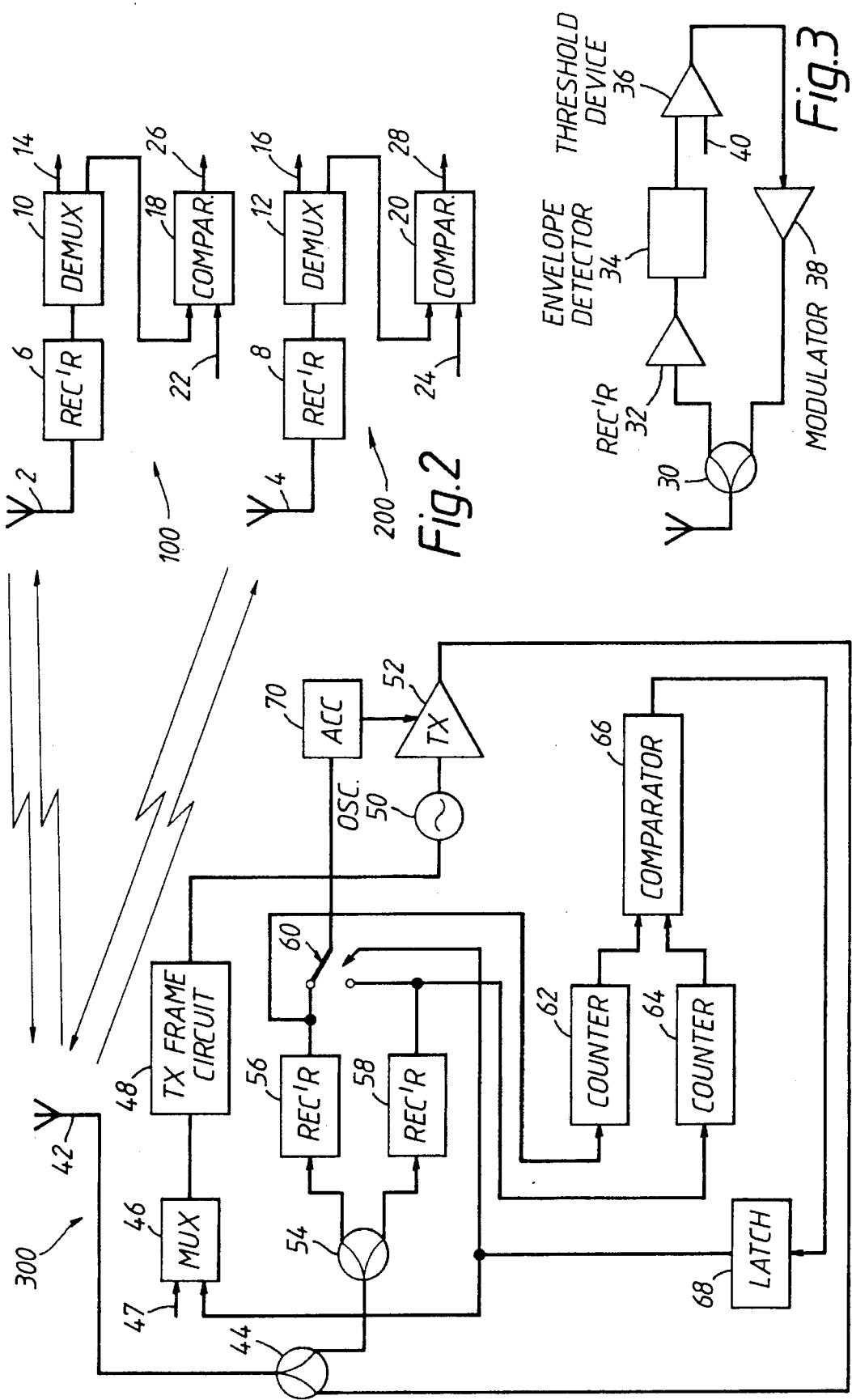

MOBILE RADIO SYSTEM HAVING POWER LEVEL CONTROL SIGNALLING

BACKGROUND OF THE INVENTION

1. Field of the Invention

The present invention relates to apparatus for use in a mobile radio system, and more particularly it relates to the control of transmit power from a mobile unit to a base station. The invention is applicable to CDMA systems, but is not necessarily limited thereto.

2. Description of the Related Art

The efficient operation of a CDMA cellular mobile radio system requires that every mobile unit transmit the minimum power necessary for acceptable communication at all times. In a frequency re-use environment with many base stations this also implies that the mobile unit must transmit at all times to the base station permitting operation with the minimum mobile transmit power. The choice of this base station will be a function, not only of the relative path losses, but also of the relative interference levels at the two (or more) preferred base stations.

A known solution for solving this problem for the uplink (mobile to base station direction) has been the use of a so-called 'soft handoff'. In this mode of operation, two (or more) base stations attempt to receive the signal and demodulate it. These base stations then pass their signals onto the mobile switching center where the better signal is selected.

This approach has two problems. During operation of the 'soft handoff' mode, two (or the number of base stations involved, if greater) simultaneous links must be established. There is a cost associated with this additional traffic, particularly if the backbone network capacity is rented from a third party operator.

Furthermore, the use of CDMA cellular mobile radio requires fast accurate power control to mitigate the so-called 'near far problem' which is known to those versed in the art. If closed loop power control is implemented, there is a potential conflict between the control exerted from the two base stations. One known approach implements a 'lowest wins' strategy in which the control of one mobile unit by two base stations is exerted in such a way that the mobile unit will increase its power only if both base stations require this. There is a potential inefficiency involved in this strategy which is illustrated by reference to FIG. 1.

Referring to FIG. 1, the first plot shows the path gain relative to power control demand threshold for two base stations receiving a signal from one mobile unit. Taking each base station individually, then the position would be that whenever the relative path gain equals the threshold, the mobile transmitter is set to a nominal value. Otherwise it is increased or decreased as necessary to keep the received signal at the threshold. The 'lowest wins' strategy leads to the illustrated power profile. This in turn leads to the conditions illustrated in the second and third plots. It can be seen that in neither case is the threshold power obtained over the entire period. If this period corresponds to an error control coding interleaving frame, then it is likely that the signal may be uncorrectable at both base stations. To avoid this, it is necessary to increase the power control threshold. However, this would result in an unnecessary increase in transmit power whenever only one of the base stations was dominant throughout a frame. Moreover, the added power fluctuations tend to degrade error performance.

An aim of the present invention is to provide means by which the above mentioned problems are avoided while retaining the necessary responsiveness to path changes.

SUMMARY OF THE INVENTION

The present invention provides a cellular mobile radio system having at least two base stations, and at least one mobile unit arranged to communicate with the base stations via a radio medium. Each base station has means for detecting the power of received signals, means for generating a power control signaling bit for controlling the amplitude of a power signal and means for transmitting the power signal to the mobile unit. The mobile unit has means for receiving the power control bits, and means for monitoring the power control bits to identify the base station sending a greater number of control bits over a transmit frame, thereby indicating that base station has received the higher average power signal over the transmit frame.

Preferably, each mobile unit includes means for directing the next frame of information to the base station which received the higher average power signal.

Preferably, the means for monitoring the power control bits has first and second receivers arranged to receive the power control bits, the outputs of which are connected to the input of first and second counters arranged to count the number of down signals generated by the receivers. An output from each counter is applied to a comparator to determine which of the base stations has received the higher average power signal and generates a control signal for controlling switching means for determining which receiver is allowed to transmit its contents from the mobile unit.

An embodiment of the present invention will now be described with reference to the accompanying drawings.

BRIEF DESCRIPTION OF THE DRAWINGS

FIG. 2 shows a block diagram of a hardware implementation of the present invention showing a mobile station communicating with two base stations.

FIG. 3 shows a block diagram of part of the circuit used for power control which is located in each of the base stations of the present invention.

DETAILED DESCRIPTION OF THE PREFERRED EMBODIMENTS

Figure 1A:
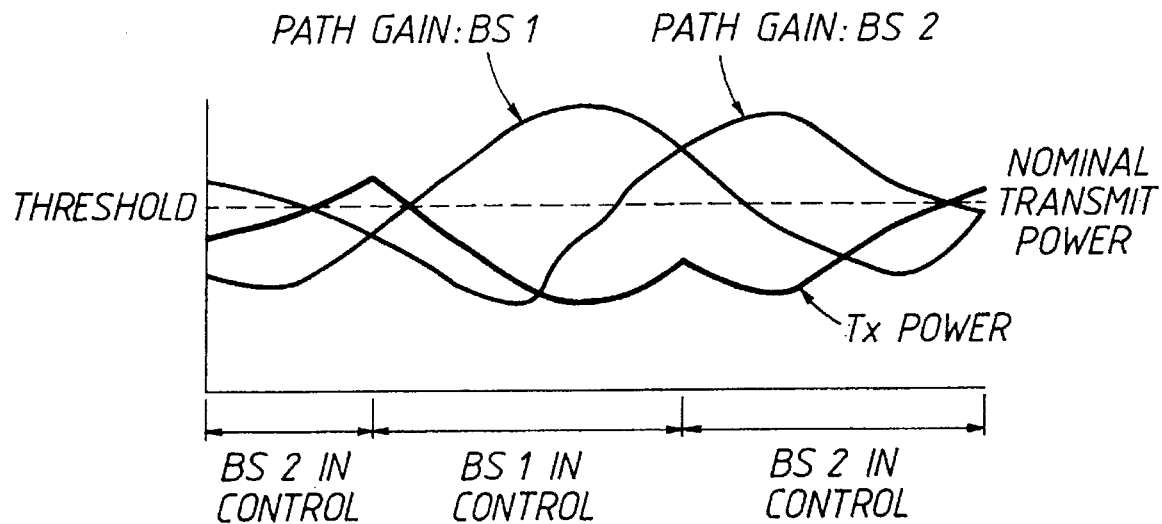
FIGS. 1a, 1b and 1c illustrates prior art power plots.
Figure 1B:
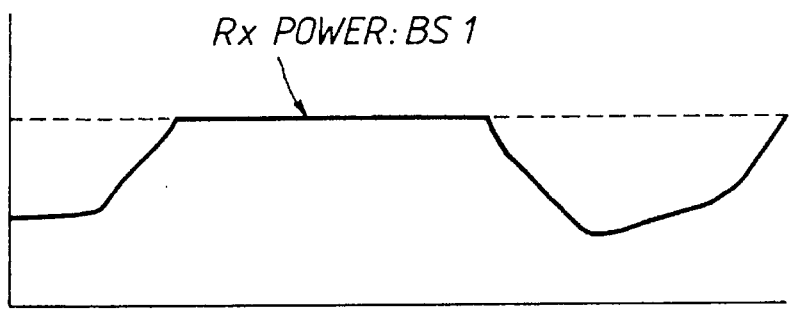
Figure 1C:
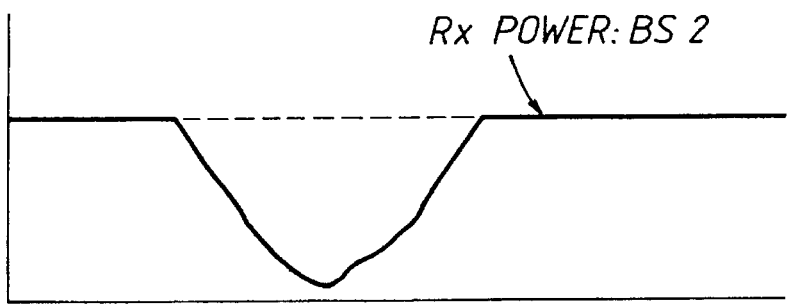

Referring to FIG. 2, two base stations 100, 200 are shown, although any number of base stations may be provided. Each base station antenna 2, 4 is connected to a receiver module 6, 8, respectively. The output of which is connected to a demultiplexer 10, 12, respectively. Each demultiplexer 10, 12 generates an output data signal on an output line 14, 16, respectively. Each de-multiplexer 10, 12 has a further output connected to an input of a comparator 18, 20, respectively. Each of which receives an input signal on a line 22, 24, respectively. This signal is indicative of a base station identity. Each of the comparators 18, 20 have an output line 26, 28 respectively, upon which a signal is generated indicative of the comparison.

Referring to FIG. 3, each of the base stations 100, 200 include the circuitry shown in FIG. 3 which comprises a splitter 30 connected to the antenna. An output from the splitter 30 is connected to an input of a receiver 32. The output of the receiver 30 is connected to an envelope detector 34. The output of the detector 34 is connected to an input of a threshold device 36. The output of the threshold device 36 is connected to an input of a modulator 38. The output of the modulator 38 is connected to a further input of the splitter 30. The threshold device 36 is tied at a second input 40 thereof to a preset voltage signal. The operation of the circuit shown in FIG. 3 is described in detail below with reference to FIG. 2.

Referring back to FIG. 2, the mobile unit 300 includes an antenna 42 connected to an output of a splitter/combiner 44. A multiplexer 46 receives data from a source on an input line 47 and is connected to an input of a transmit frame circuit 48 which feeds, via an oscillator 50, into a transmitter 52. The transmitter 52 is controlled by an accumulator 70. The output of the transmitter 52 is connected to an input of the splitter/combiner 44. A further output of the splitter/combiner 44 is connected to a splitter 54. The outputs of the splitter 54 are connected to an input of a receiver 56, 58, respectively. The outputs from the receivers 56, 58 are respectively connected to a contact of a switch 60. The output of the receiver 56 is connected to an input of a counter 62, and the output of the receiver 58 is connected to an input of a counter 64. The outputs from the counters 62, 64 are connected to a digital comparator 66. The output of the comparator 66 is connected to an input of a latch circuit 68. The output of the latch circuit 68 is connected to the switch 60 and to a further input of the multiplexer 46 for controlling the switch 60 and the multiplexer 46.

The operation of the circuits of FIGS. 2 and 3 will now be described. FIG. 2 shows a mobile unit 300 in communication with base stations 100, 200. Only the uplink, i.e. the link running from the direction mobile unit to the base station is considered for this invention. However, it will be appreciated that power control links running in the opposite direction, i.e. base station to mobile unit are necessary for signalling purposes. The mobile unit transmits its signal to the base stations 100, 200.

As shown in FIG. 3, these base stations include a receiver 32 and an envelope detector 34 for detecting the power of the received signals from that particular mobile unit. This is compared in a threshold device 36 and, according to the power, a power control bit is generated. If the received signal power exceeds the threshold, a reduced power signal is generated. If it is below the threshold, an increased power signal is generated and transmitted through the relevant part of the modulator 38 using the modulation format applicable for that system. These signals are broadcast by the two base stations 100, 200 according to the powers as received in those base stations. The mobile unit 300 receives the signal which passes through the splitter/combiner 44, which is the coupler that multiplexes between receive and transmit, onto the splitter 54. The splitter 54 divides into the two receivers 56, 58 for the power control signalling bits. In fact, this distinguishing is done for a CDMA cellular mobile radio system on the basis of spreading codes. At this stage the correct received power control data sequence has to be selected via a switch 60, which is under control from a latch circuit 68. The manner in which the state of the latch circuit 68 is controlled is explained below.

At the output of the switch 60 is an accumulator 70, which takes the accumulated up/down signals to create an overall level which controls the power of the output transmitter 52. This power is transmitted. The outputs of receivers 56, 58 are also connected to the counters 62, 64. The counters 62, 64 count the number of down signals generated by the receivers 56, 58 and are connected to a digital comparator 66. The comparator 60 compares the number of down signals received from the two base stations 100, 200. The base station sending the greater number of down signals (the station that received the higher average signal power over a transmit frame) and therefore can be considered the better base station for selection in the following frame. The output of the comparator 66 therefore, if negative, sets the latch circuit 68 to be a logical signal level of "one" and if positive, sets the latch circuit 68 to be a logical signal level of "zero" for the following frame. Thus, the operation of the counters 62, 64 is synchronous with the transmit frame structure. As a result, the power control operation is controlled for each frame on the basis of the signal quality at the base stations applying in the previous frame.

An auxiliary function is that there is a requirement for the mobile unit to direct its frame to the base station considered to be optimum. This is done by multiplexing a base station selection bit into the transmit frame. Thus, the output of the latch circuit 68 is fed into the multiplexer 46 together with the data on the input line 47, to be transmitted from the mobile unit 300 to the network via the base station. This data is passed from the multiplexer 46 to a transmit frame circuit 48 which performs all functions such as broad error correction coding, error checksum and, interleaving, to produce the signal that is actually modulated onto the transmitter 52. The signal that is transmitted to base stations 100, 200 passes into the receiver module 6, 8 where an attempt is made to demodulate it, in particular the checksum is applied. If that checksum is successful, then demultiplexing is applied by demultiplexer 10, 12, to separate out the one bit of data that corresponds to the base station selection. This is then compared with the base station identity on input line 22, 24, in the comparator 18, 20 to determine whether there is a match between the bit and the base station. If this match applies, then the data is launched from that base station into the backbone network onto the mobile switching center, otherwise it is not.

If the above invention is used in connection with a statistically multiplexed backbone network, it will result in a significant reduction in the average traffic level. When the network is operating close to capacity, this mean reduction will also be reflected in peak traffic levels.

The present invention overcomes the problem of power controlled conflict experienced in the prior art because the mobile is only under control of one base station at a time for the period which matters, i.e. an error control coding interleaving frame.

The present invention may readily be extended to cater to a multiplicity of base stations. This would require the power control signals from all relevant base stations to be logged at the mobile unit in order to select the best for the next frame. The mobile unit must now transmit more than one base station identification bit (i.e. one bit for two base stations, two bits for three base stations etc). In practice the system design would include enough bits to cater to the maximum number of base stations which might apply anywhere within the system.

The actual mapping between the base station identification bits and base station could be determined at the time when the multi-base station mode was established. For the case of two base stations in operation, one option would be to use zero for the base station to which the mobile was affiliated first, and one for the mobile which was added although any sensible mapping could be used.

In the above description, the mobile unit counts the power control signals throughout its frame. However, the latest power control signals occurring in the frame could be ignored to allow a decision to be taken earlier, giving time to construct the next transmit frame in time for it to be modulated.

Although other modifications and changes may be suggested by those skilled in the art, it is the intention of the inventors to embody within the patent warranted hereon all changes and modifications as reasonably and properly come within the scope of their contribution to the art.

I claim:

1. A cellular mobile radio system including at least two base stations and at least one mobile unit arranged to communicate with the base stations via a radio medium, said system comprising:

each of said at least two base stations further including:
means for detecting a power level signal of received signals from said at least one mobile unit;
means for generating a power control signalling bit for controlling the amplitude of a signal transmitted by said at least one mobile unit; and
means for transmitting the power signal to said at least one mobile unit;

said at least one mobile unit further including:
means for receiving said power control signalling bits; and
means for monitoring said power control signalling bits to identify one of said at least two base stations sending a greater number of said control signalling bits over a transmit frame, thereby indicating that said one of said at least two base stations has received a higher average power signal over said transmit frame.

2. A cellular mobile radio system as claimed in claim 1, wherein each said at least one mobile unit further comprises:
means for directing a next frame of information to the one of said at least two base stations which received the higher average power signal over the transmit frame.

3. A cellular mobile radio system as claimed in claim 2, wherein the means for monitoring the power control signalling bits further comprises:
first and second receivers arranged to receive the power control signalling bits, said receivers having respective outputs;
first and second counters arranged to count a number of down signals generated by said receivers, said outputs of said receivers being respectively connected to said inputs of said first and second counters, said counters having respective outputs;
a comparator having a first and a second input each respectively connected to each said respective output from each of said counters to determine which of said at least two base stations has received the higher average power signal, said comparator generating a control signal; and
switching means for determining which receiver is allowed to transmit its contents from said at least one mobile unit, said switching means being operatively controlled by said control signal generated by said comparator.

4. A cellular mobile radio system as claimed in claim 3, wherein said switching means includes an output, and said system further comprises:
a transmitter having an input and an output; and
an accumulator connected to said output of said switching means and arranged to accumulate up/down signals to create an overall signal level for controlling said output of said transmitter.

5. A cellular mobile radio system as claimed in claim 4, wherein the means for directing the next frame of information to a particular base station comprises:
a latch having an output;
a multiplexer having a first input to receive said output of said latch and a second input to receive data to be transmitted from said mobile unit, said multiplexer having an output; and
a framer circuit connected to said multiplexer output and constructed and arranged to perform broad error correction coding, error checksum and interleaving to produce a signal to be modulated onto said input of said transmitter.

6. A cellular mobile radio system as claimed in claim 1, wherein said means for detecting the power level signal of received signals in each of said at least two base stations further comprises:
a receiver having an output; and
an envelope detector having an input connected to said receiver output.

7. A cellular mobile radio system as claimed in claim 6, wherein said means for generating a power control signalling bit in each said base station further comprises:
a threshold device arranged to compare the detected power of the received signals with a predetermined threshold to produce a reduced power signal if the received power exceeds said predetermined threshold, and to produce an increased power signal if the received power is below said predetermined threshold.

8. A cellular mobile radio system as claimed in claim 1, wherein each said base station further comprises:
a comparator having a first input arranged to receive a base station identification signal and a second input arranged to receive data corresponding to base station selection, said identification signal being compared with data corresponding to base station selection and if a match is found, said data being launched from said base station into a network onto a mobile switching center.

9. A cellular mobile radio system as claimed in claim 8, wherein said network is a statistically multiplexed backbone network.

* * * * *